United States Patent [19]

Hoshihara

[11] Patent Number: 5,289,986
[45] Date of Patent: Mar. 1, 1994

[54] ACCELERATION SENSOR

[75] Inventor: Naoaki Hoshihara, Nagoya, Japan

[73] Assignee: Aisin Seiki Kabushiki Kaisha, Kariya, Japan

[21] Appl. No.: 673,664

[22] Filed: Mar. 22, 1991

[30] Foreign Application Priority Data

Mar. 23, 1990 [JP] Japan .................. 2-30421[U]

[51] Int. Cl.⁵ .............................................. B60R 22/40
[52] U.S. Cl. ............................................ 242/107.4 A
[58] Field of Search ............... 242/107.4 A; 280/806; 297/478, 480

[56] References Cited

U.S. PATENT DOCUMENTS

| | | | |
|---|---|---|---|
| 3,995,788 | 12/1976 | Stephenson et al. | 242/107.4 A |
| 4,063,695 | 12/1977 | Oshikawa | 242/107.4 A |
| 4,069,988 | 1/1978 | Pouget | 242/107.4 A |
| 4,087,059 | 5/1978 | Lindblad | 242/107.4 A |
| 4,331,304 | 5/1982 | Matsuoka et al. | 242/107.4 A |
| 4,401,282 | 8/1983 | Miki | 242/107.4 A |
| 4,467,981 | 8/1984 | Mori et al. | 242/107.4 A |
| 4,524,924 | 6/1985 | Proctor | 242/107.4 A |
| 4,610,480 | 9/1986 | Yamada et al. | 242/107.4 AX |

FOREIGN PATENT DOCUMENTS

| | | |
|---|---|---|
| 2645456 | 4/1968 | Fed. Rep. of Germany ... 242/107.4 A |
| 3824164 A1 | 7/1988 | Fed. Rep. of Germany . |
| 52-20524 | 2/1977 | Japan ........................ 242/107.4 A |
| 64-115 | 8/1989 | Japan . |

*Primary Examiner*—John M. Jillions
*Attorney, Agent, or Firm*—Finnegan, Henderson, Farabow, Garrett and Dunner

[57] ABSTRACT

An acceleration sensor having a sensor body rotatably mounted in a casing. A sensing ball is mounted in the sensor body for detecting acceleration. A balancing weight is secured to the sensor body for continuously orientating the sensor body in a horizontal direction in order to prevent the influence of gravity acceleration on sensing ball.

7 Claims, 3 Drawing Sheets

ACCELERATION SENSOR

BACKGROUND OF THE INVENTION

1. Field of the Invention

The present invention relates to an acceleration sensor, and in particular to an acceleration sensor for mounting in a vehicle.

2. Description of Related Art

Conventionally, an acceleration sensor for a vehicle is disclosed in Japanese Utility model Laid-open Print No. 64-115 which was published in 1989 without examination. In this conventional device, a ball is provided for sensing an acceleration. The ball is designed to be moved upon detection of the acceleration which is measured by the amount of rotation of a lever which is operatively connected to the ball.

However, in the conventional device, a body in which the ball is rotatably mounted is set in a stationary condition. So, when a member such as a seat-back to which the body is mounted is inclined, the sensor detects the gravity acceleration in addition to the vehicle acceleration. This means that the conventional device will operate despite the non-existence of the vehicle acceleration.

SUMMARY OF THE INVENTION

It is, therefore, an object of the present invention to provide an acceleration sensor which only operates when an acceleration force, such as a collision, affects a vehicle.

In order to achieve this object, an acceleration sensor comprises a casing, a sensor body disposed in the casing rotatably mounted to pivot about an axis, the sensor body including a receiving portion. A balancing means is secured to the sensor body for continuously orienting the body in a horizontal position in the casing. A sensing means for detecting the acceleration is mounted in the receiving portion of the body, co-axial with the sensor body. A sensor lever pivotally mounted on the sensor body, includes a sensing portion in communication with the sensing means and an end portion disposed in the vicinity of the axis of rotation.

Additional objects and advantages of the invention will be set forth in part in the description which follows and in part will be obvious from the description or may be learned by practice of the invention. The objects and advantages of the invention may be realized and attained by means of the instrumentability and combinations particularly pointed out in the appended claims.

BRIEF DESCRIPTION OF THE DRAWINGS

The accompanying drawings which are incorporated in and constitute a part of the specification illustrate the embodiments of the invention, and together with the description serve to explain the objects, advantages and principles of the invention.

DETAILED DESCRIPTION OF THE PREFERRED EMBODIMENT

Figure 1:
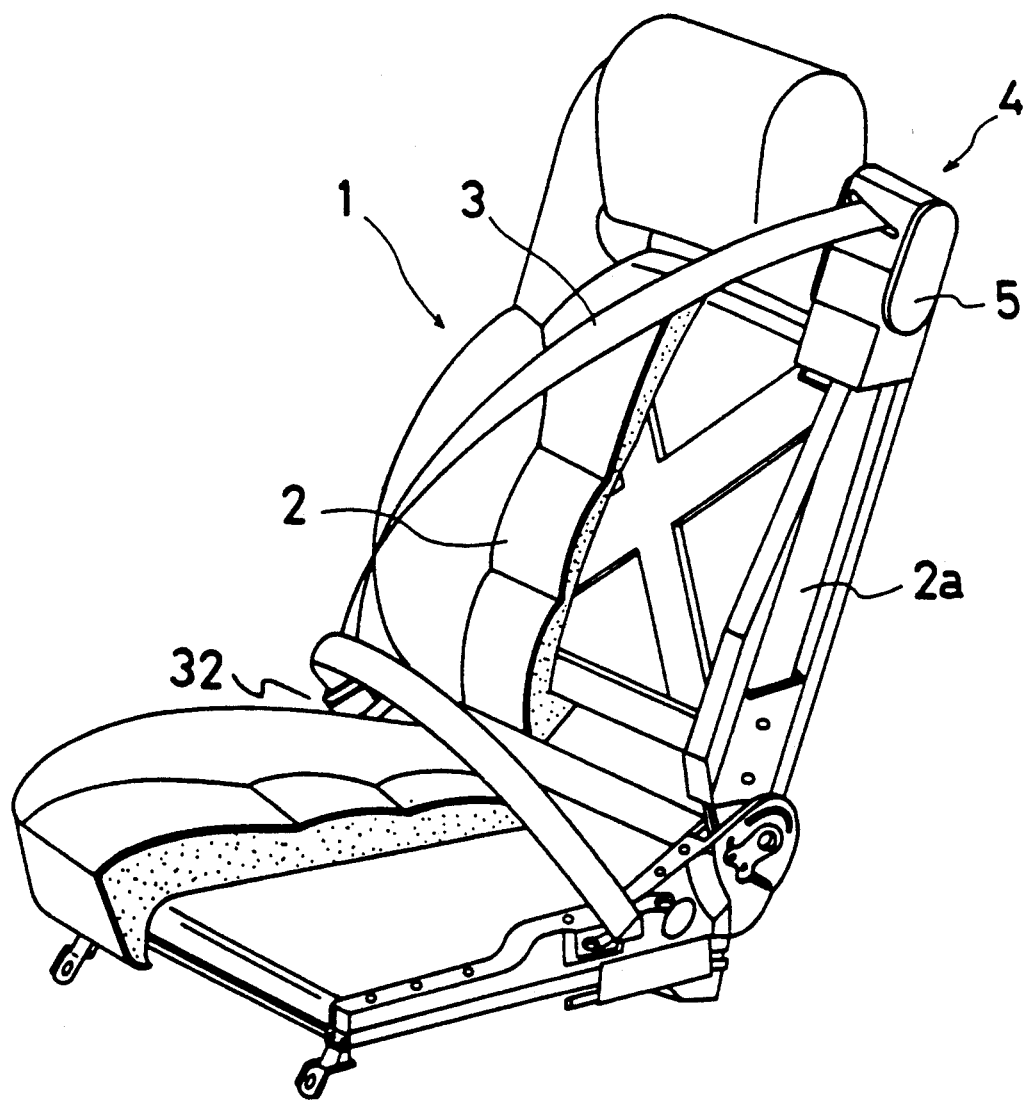
FIG. 1 is a perspective view of a seat belt arrangement having a retractor mechanism and an acceleration sensor in accordance with the present invention.
Figure 2:
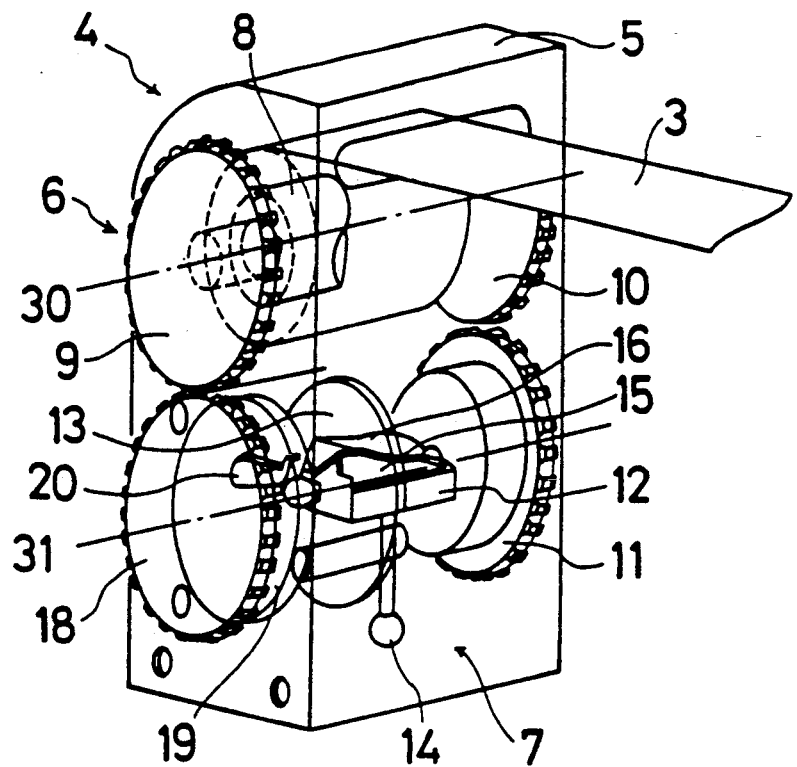
FIG. 2 is a perspective view of the retractor mechanism of the present invention.

Referring now to FIGS. 1 through 5, a seat apparatus 1 includes a seat-back 2 provided at its shoulder portion with a frame 2a to which a seat-belt retractor 4 is fixed. A webbing 3 which serves to protect a vehicle occupant (not shown) is arranged to be extracted from or retracted into the retractor 4. As shown in FIG. 2, the retractor 4 includes a retracting mechanism 6 and an acceleration sensor 7, both of which are accommodated in a casing 5.

The retracting mechanism 6 has a spool 8 upon which the webbing 3 is wound. The spool 8 is rotatably mounted on a shaft 30 which is secured to the casing 5. One end portion of the spool 8 is operatively connected, via a locking or locking-up mechanism (not shown), to a gear 9 which is also rotatably mounted on the shaft 30. A gear 10 is rotatably mounted on the shaft 30 at the other end of the spool 8. The gear 10 is arranged in mesh engagement with a gear 11. The gear 11 is rotatably mounted on a shaft 31 secured to the casing 5. A spiral spring (not shown) is disposed between the gear 11 and the shaft 31 so as to continually retract the webbing 3.

Under the foregoing construction, the webbing 3 is readily extractable from retractor 4. The adaptation of the webbing 3 around the occupant can be established by locking the webbing 3 in a conventional locking mechanism 32, shown in FIG. 1. When the webbing 3 is released from locking mechanism 32, spool 8 is rotated due to the continual biasing force of the spiral spring and via gears 9 and 10, thereby establishing an automatic retraction of the webbing 3. If during extraction the rotation of the gear 9 is restricted or prevented, the webbing 3 is prevented from being extracted due to the restriction of the spool 8 as a result of the locking mechanism.

Figure 3:
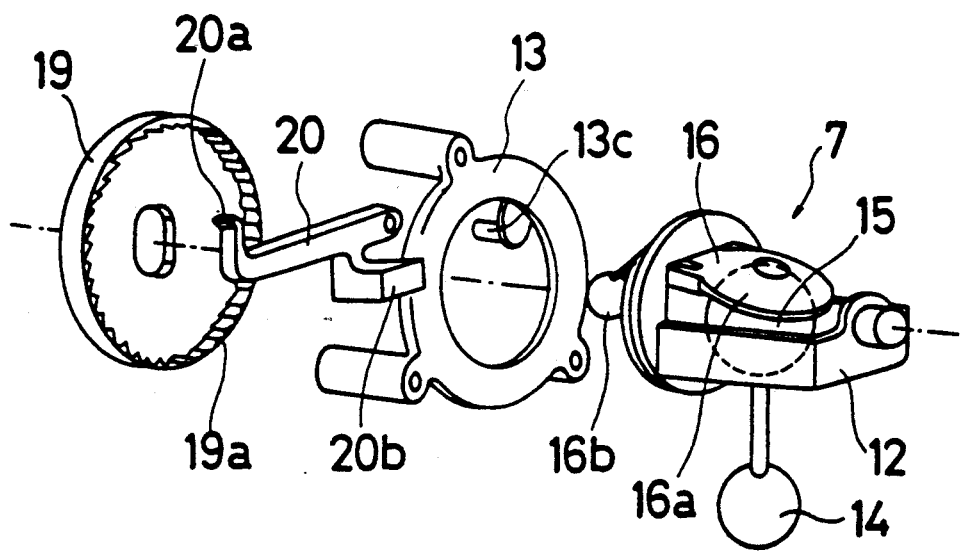
FIG. 3 is an exploded perspective view of the acceleration sensor shown in FIG. 2.
Figure 4:
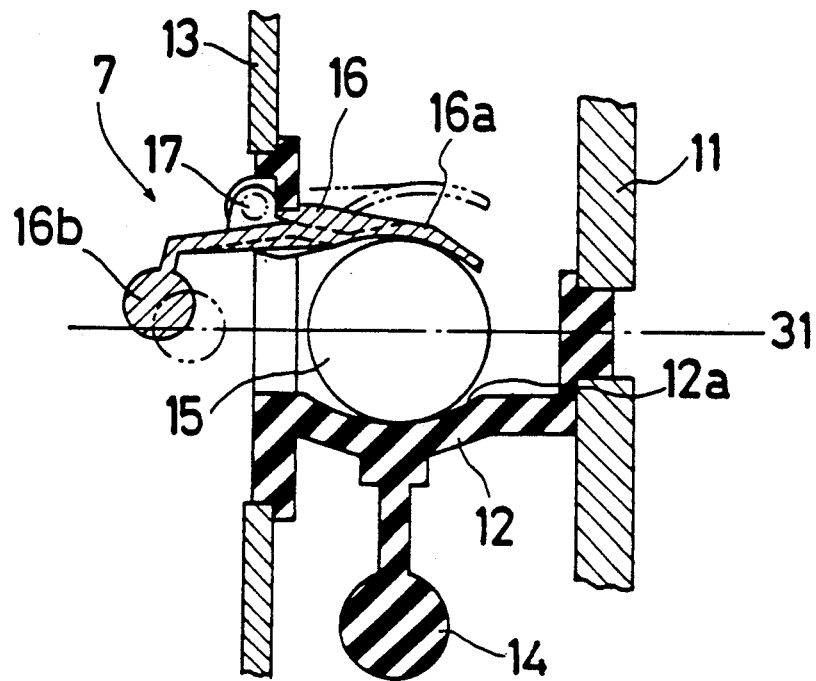
FIG. 4 is a cross-sectional view of the acceleration sensor.

The acceleration sensor 7 will be described with reference to FIGS. 2-4. As shown in FIGS. 2 through 4, a sensor body 12 which is rotatably supported on the shaft 31 is rotatable relative to the casing 5. One end of the body 12 is connected to the gear 11 and the other end is rotatably supported by a base plate 13 secured to the casing 5. A balancing weight 14 is formed integral with the body 12 in order to continuously orientate the body 12 in a horizontal position in the casing. The body 12 is provided with a receiving portion 12a in the form of a spherical concaved configuration, as shown in FIG. 4. In the receiving portion 12a there is mounted a sensing ball 15 whose central point is in coincidence with the axis of the shaft 31. A sensor lever 16 is pivoted via a pin 17 to the body 12. At one end portion of the lever 16 there is a sensing portion 16a in the form of a spherical concaved configuration so as to contact and conform to the ball 15. The other end portion of the lever 16 is formed into a ball configuration 16b and is located in vicinity of the shaft 31 and substantially aligned with the axis of rotation.

A gear 18 which is in mesh engagement with the gear 9 is rotatably mounted in axial alignment with the shaft 31 and is connected to a ratchet 19 so as to establish a unitary rotation therebetween. Base plate 13 includes a shaft 13c. A rotatably mounted trigger lever 20 is disposed on shaft 13c. The trigger lever 20 is provided with a pawl 20a which is engageable with a geared portion 19a of the ratchet 19 and which communicates with the ball portion 16b of the lever 16.

In operation, when acceleration is applied to the vehicle body, upon collision, for example, the ball 15 detects the acceleration and contacts receiving portion 12a on the sensor body 12. Due to this resulting movement, the sensing portion 16a is biased, thereby rotating the lever 16 as shown in FIG. 4. The ball portion 16b of the lever 16 urges the abutting 20b portion of the trigger lever 20 to rotate the lever. This resulting rotation of the trigger 20 establishes the mesh engagement between the pawl 20a and the geared portion 19a of the ratchet 19, thereby restricting the ratchet 19 from rotation. As a result, the rotation of the gear 9 via the gear 18 is restricted and the webbing 3 is prevented from being extracted from retractor 4, thus stabilizing the occupant.

Figure 5:
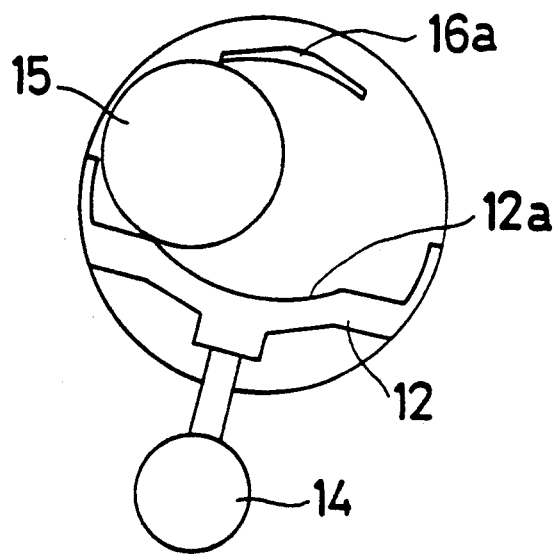
FIG. 5 is an end view of the acceleration sensor in operation.

If an application of the acceleration is made perpendicular to the shaft 31, as shown in FIG. 5, despite rotation of the body 12 due to actuation of the balancing weight 14, the ball 15 is moved similar to the balancing weight 14. This movement of the ball 15 is established relative to the body 12, along the receiving portion 12a. Due to the resulting movement of the ball 15, the sensing portion 16a of the lever is urged, which results in the rotation thereof. This leads to the biasing of the ball portion 16b on the abutting portion 20b of the trigger 20, thereby rotating the trigger 20. As a result, the meshing engagement between the pawl 20a and the geared portion 19a of the ratchet 19 is established, thereby restricting the rotation of the ratchet 19 and the subsequent rotation of the gear 9 via the gear 18. Thus, the extraction of the webbing 3 is prohibited.

As mentioned above, since the body 12 is mounted to the casing 5 so as to be rotatable relative thereto, the balancing weight 14 assures the horizontal condition of the body 12 despite the reclining movement of the seatback 2. Thus, the sensor 7 can operate accurately, upon detection of the artificial acceleration, without the influence of gravity acceleration. In addition, the ball portion 16b of the lever 16 serves as an output portion of the sensor 7 at a position near the shaft 31 and assures the fixed position of the ball portion 16b, thereby preventing the trigger 20 from failing to operate or operating in error which may occur from the rotation of the body 12.

Other embodiments of the invention will be apparent to those skilled in the art from the consideration of the specification and practice of the invention disclosed herein. It is intended that the specification be considered exemplary only, with a true scope and spirit of the invention being indicated by the following claims.

What is claimed is:

1. An acceleration sensor, comprising:
   a casing;
   a sensor body disposed in the casing rotatably mounted to pivot about an axis, the sensor body including a receiving portion;
   balancing means secured to the sensor body for continuously orienting the receiving portion in a horizontal position;
   sensing means mounted in the receiving portion for detecting acceleration, the sensing means being co-axial with the sensor body;
   a sensor level having opposite end portions, said sensor lever being pivotally mounted intermediate the opposite end portions on the sensor body, including a sensing portion at one of the opposite end portions in communication with the sensing means and another of the opposite end portions disposed in the vicinity of the axis of rotation; and
   a trigger lever rotatably mounted on a base plate disposed in the casing to pivot about an axis that extends in a plane substantially parallel to and in a direction parallel to the axis of rotation of the sensor body, the trigger lever having opposite ends, one of the opposite ends being in communication with the end portion of the sensor lever, and the other of the opposite ends having a pawl for restricting rotation of a ratchet upon rotation of the sensor lever.

2. The acceleration sensor of claim 1, wherein the sensing means comprises a ball.

3. The acceleration sensor of claim 1 wherein the balancing means comprises a balancing weight formed integral with the sensor body.

4. A system for controlling the extraction of a vehicle seat belt, comprising:
   retracting means rotatably disposed in a casing for retracting the seat belt, including a retracting gear portion;
   a sensor body rotatably mounted on a shaft disposed in the casing, including a receiving portion;
   sensing means mounted in the receiving portion for sensing acceleration, the sensing means being co-axial with the shaft;
   a sensor lever pivotally mounted on the sensor body, including a sensing portion in communication with the sensing means and an end portion disposed in the vicinity of the shaft;
   a base plate co-axially mounted with the shaft in the casing;
   a gear rotatably mounted on the shaft and disposed in communication with the retracting gear portion of the retracting means;
   a ratchet rotatably connected to the gear; and
   a trigger lever having opposed ends rotatably mounted on the base plate, one end being in communication with the end portion of the sensor lever and the other end being disposed to contact the ratchet, wherein when acceleration occurs the sensing means contacts the receiving portion of the sensor body, the sensor lever is pivoted, the trigger lever is rotated and the ratchet is engaged to restrict rotation of the gear and the gear portion of the retracting means to prevent the seat belt from being extracted.

5. The system of claim 4 wherein the balancing means comprises a balancing weight formed integral with the sensor body.

6. The system of claim 4 wherein the sensing means comprises a ball.

7. The system of claim 4 wherein the sensor lever is mounted to pivot about an axis that extends in a plane substantially parallel to and in a direction substantailly perpendicular to the axis of rotation of the sensor body.

* * * * *

UNITED STATES PATENT AND TRADEMARK OFFICE
CERTIFICATE OF CORRECTION

PATENT NO. : 5,289,986
DATED : March 1, 1994
INVENTOR(S) : Naoaki HOSHIHARA

It is certified that error appears in the above-indentified patent and that said Letters Patent is hereby corrected as shown below:

Claim 7, column 4, line 64, change "substantailly" to
--substantially--.

Abstract, line 7, after "on", insert --the--.

Signed and Sealed this

Twenty-second Day of November, 1994

Attest:

BRUCE LEHMAN

Attesting Officer

Commissioner of Patents and Trademarks